(12) United States Patent
Atkins et al.

(10) Patent No.: US 8,261,330 B2
(45) Date of Patent: *Sep. 4, 2012

(54) FEDERATED IDENTITY BROKERING

(75) Inventors: Barry D. Atkins, Raleigh, NC (US);
David O. Melgar, Raleigh, NC (US);
Anthony Nadalin, Austin, TX (US);
Ajamu A. Wesley, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 12/547,081

(22) Filed: Aug. 25, 2009

(65) Prior Publication Data

US 2009/0313467 A1    Dec. 17, 2009

Related U.S. Application Data

(63) Continuation of application No. 10/878,855, filed on Jun. 28, 2004, now Pat. No. 7,581,248.

(51) Int. Cl.
*G06F 9/40* (2006.01)
*G06F 21/20* (2006.01)

(52) U.S. Cl. .................... 726/4; 726/18; 726/1

(58) Field of Classification Search ................ None
See application file for complete search history.

(56) References Cited

U.S. PATENT DOCUMENTS

| | | | |
|---|---|---|---|
| 6,237,099 B1* | 5/2001 | Kurokawa | 726/4 |
| 2001/0013096 A1* | 8/2001 | Luckenbaugh et al. | 713/154 |
| 2002/0129264 A1* | 9/2002 | Rowland et al. | 713/200 |
| 2003/0005290 A1* | 1/2003 | Fishman et al. | 713/156 |
| 2004/0158818 A1* | 8/2004 | Smith et al. | 717/127 |

* cited by examiner

*Primary Examiner* — Venkat Perungavoor
(74) *Attorney, Agent, or Firm* — Steven M. Greenberg, Esq.; Carey, Rodriguez, Greenberg & O'Keefe

(57) ABSTRACT

A method, system and apparatus for federated identity brokering. In accordance with the present invention, a credential processing gateway can be disposed between one or more logical services and one or more service requesting clients in a computer communications network. Acting as a proxy and a trusted authority to the logical services, the credential processing gateway can map the credentials of the service requesting clients to the certification requirements of the logical services. In this way, the credential processing gateway can act as a federated identity broker in providing identity certification services for a multitude of different service requesting clients without requiring the logical services to include a pre-configuration for specifically processing the credentials of particular service requesting clients.

8 Claims, 3 Drawing Sheets

FEDERATED IDENTITY BROKERING

CROSS-REFERENCE TO RELATED APPLICATIONS

This application is a Continuation of U.S. application Ser. No. 10/878,855, filed Jun. 28, 2004, issued as U.S. Pat. No. 7,581,248 on Aug. 25, 2009, entitled "FEDERATED IDENTITY BROKFRING," which is incorporated herein by reference in its entirety.

BACKGROUND OF THE INVENTION

1. Statement of the Technical Field

The present invention relates to federated identity management, and more particularly to brokering federated identities in a computer communications network.

2. Description of the Related Art

Logical services such as Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requester through the use of any supporting messaging protocol, including for example, the simple object access protocol (SOAP).

Web services users typically can be known by multiple identities across multiple, secure, computing domains. In particular, each user can enjoy a unique identity within a particular secure domain which can differ from the identity enjoyed by the same user in a different secure domain. This multiplicity of identities for individual users can impede the ability of Web services in each secure domain to collaborate with one another in order to provide a higher level of function desirable to an end user or requesting process. Yet, it can be desirable to collaboratively arrange Web services in multiple secure domains so as to capitalize on the integration of information form the multiple different domains to form a cohesive application.

The notion of a federated identity can require the exchanging of identity information in the form of security credentials between different secure domains to provide a level of collaboration necessary to arrange Web services into a cohesive coputing application. Presently, a wide variety of credential forms are known to be available including Kerberos, X.509, LTPA and the like. Notably, when accessing a single Web service provider, the credential format can be manageable problem. In contrast, handling with credential formats and their associated trust relationships can become an acute and complex problem when attempting to federate an arbitrarily large set of Web services providers. Generally, a canonical form of credentials can suffice as the sole solution to the problem of federated identities. Notwithstanding, the use of a canonical form of credentials can become unwieldy for large sets of providers.

SUMMARY OF THE INVENTION

The present invention addresses the deficiencies of the art in respect to the federation of identity in a computer communications network and provides a novel and non-obvious method, system and apparatus for the dynamic transformation of credential formats and for the exchange of credential information between computing processes in a computer communications network. Specifically, a gateway service/proxy can be disposed between a logical service and a requesting process. The gateway service/proxy can expand the service description of the logical service to include a broader security description. Consequently, the gateway service/proxy can accept and map a variety of credentials from requesting processes to the requirements of the logical service to validate the credentials of the requesting processes.

A federated identity brokering method can include intercepting a service request targeting a specific logical service and comparing a security credential associated with the service request to credential requirements specified by the specific logical service. The security credential can be modified to comport with the credential requirements. Subsequently, the intercepted service request can be routed with the modified security credential to the specific logical service. The intercepting step can include retrieving an original service description for the specific logical service from a privately accessible registry and expanding the original service description to include broader credential requirements. Also, a service address in the expanded service description can be changed for the specific logical service to specify a proxy to the specific logical service for performing the comparing, modifying and routing steps. Finally, the expanded service description can be published to a publicly accessible service registry.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for federated identity brokering. In accordance with the present invention, a credential processing gateway can be disposed between one or more logical services and one or more service requesting clients in a computer communications network. Acting as a proxy and a trusted authority to the logical services, the credential processing gateway can map the credentials of the service requesting clients to the certification requirements of the logical services. In this way, the credential processing gateway can act as a federated identity broker in providing identity certification services for a multitude of different service requesting clients without requiring the logical services to include a pre-configuration for specifically processing the credentials of particular service requesting clients.

Figure 1:
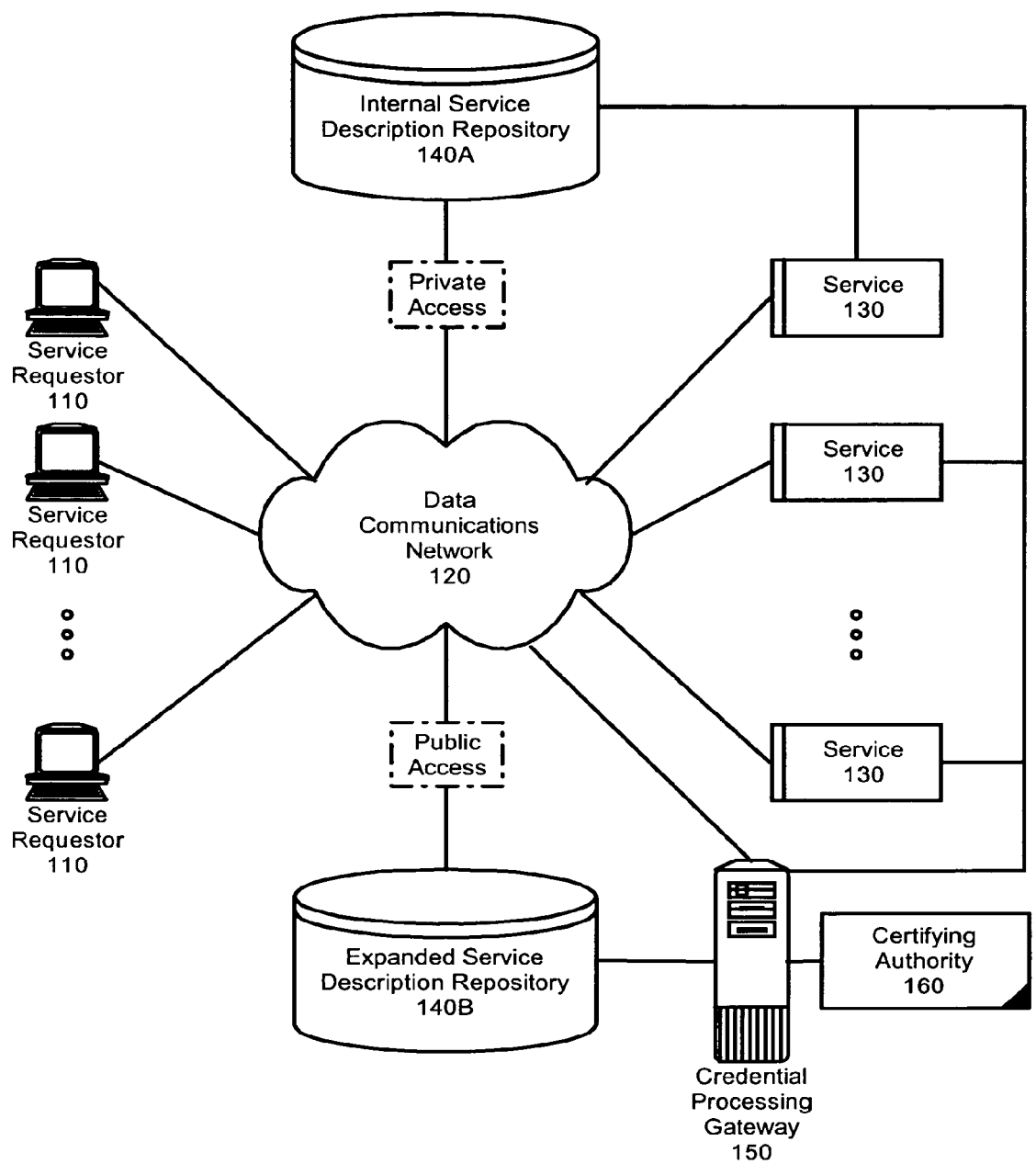
FIG. 1 is a schematic illustration of a service delivery network configured for federated identity brokering in accordance with the present invention.

In further illustration of the preferred embodiments of the present invention, FIG. 1 is a schematic illustration of a service delivery network configured for federated identity brokering in accordance with the present invention. Referring to FIG. 1, one or more service requesting clients 110 can be communicatively coupled to one or more logical services 130 over a data communications network 120. The service requesting clients 110 can include computing processes operating in host computing environments configured for network interoperability. The logical services 130, by comparison, can include distributed discoverable logical components, such as Web services, whose interface can be discovered through directory services such as UDDI.

Each of the logical services 130 can be coupled to an internal service description repository 140A. The internal service description repository 140A can include a directory of service offerings for each of the logical services 130. Moreover, the internal service description repository 140A can include individual descriptions of the security assertion requirements each of the individual ones of the logical services 130 which are necessary for an external one of the service requesting clients 110 to access the individual ones of the logical services 130. In this regard, the individual descriptions can include an endpoint description of the security requirements and capabilities of the individual logical services 130, specified using extensions to WSDL, such as the Web services endpoint language (WSEL), WS-Policy, to name a few. Notably, access to the internal service description repository 140A can be limited through a private interface as would be expected where the internal service description repository 140A is disposed within a private Intranet.

A credential processing gateway 160 having a certification authority process 150 also can be coupled to the internal service description repository 140A and further can be communicatively linked to the logical services 130. The credential processing gateway 160 can be configured to register subscribing ones of the services 130 and to perform federated identity brokering on behalf of subscribing ones of the services 130 for the service requesting clients 110. In this regard, an expanded service description repository 140B can be coupled to the credential processing gateway 160 and publicly exposed to the service requesting clients 110 over the data communications network 120. The expanded service description repository 140B can include expanded versions of the individual descriptions in the internal service description repository 140A.

By expanded, it is meant that the service descriptions in the expanded service description repository 140B can include a wider selection of possible security assertions and credential formats which can be processed in the credential processing gateway 160 as compared to the credential processing capabilities of any of the logical services 130. The credential processing gateway 160, acting as a federated identity broker, can map the wider selection of possible security assertions and credential formats to the more narrow, acceptable set of credentials specified in the internal service description repository 140A for corresponding ones of the logical services 130. As a result, the individual logical services 130 need not require a canonicalized form of the security credentials of the service requesting clients 110.

Figure 2:
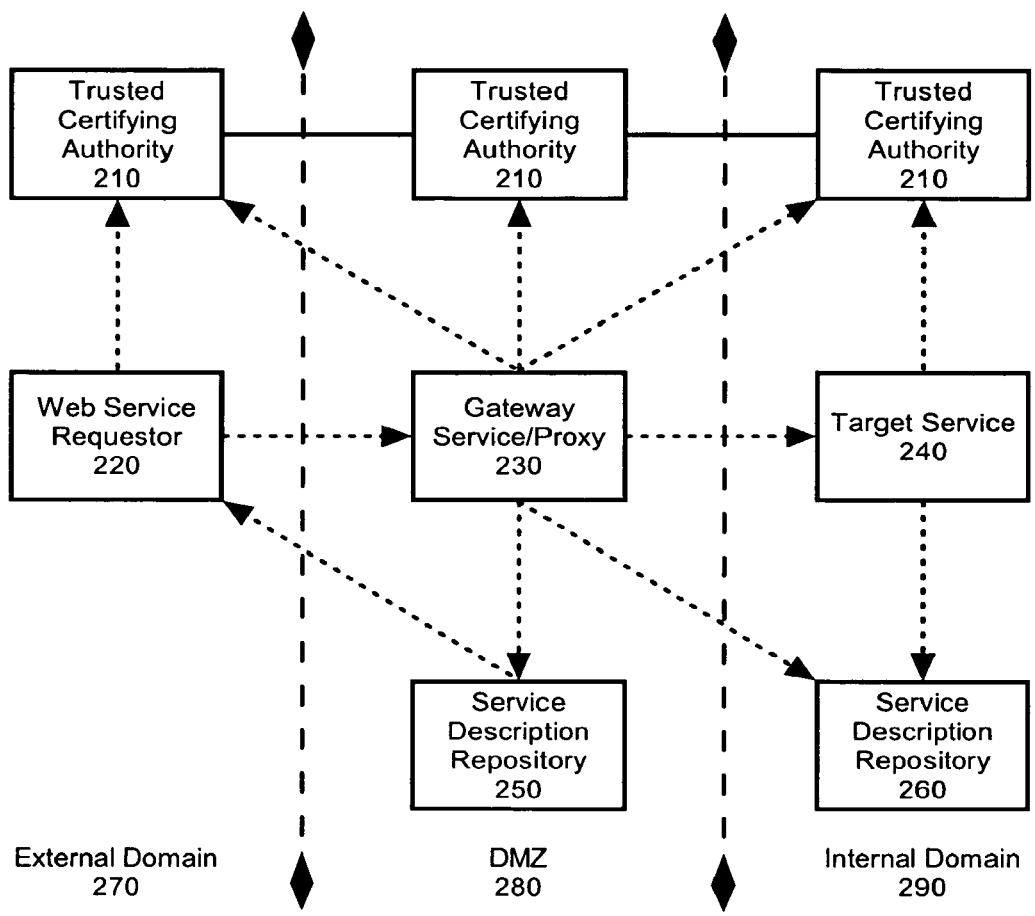
FIG. 2 is a block diagram illustrating entity interactions in a federated identity brokering process in the network of FIG. 1; and, FIG. 3 is a flow chart illustrating a federated identity brokering process in the network of FIG. 1.

In more specific illustration, FIG. 2 is a block diagram depicting entity interactions in a federated identity brokering process in the network of FIG. 1. In the process of the present invention, a target service 240 can publish an endpoint service description to the service description repository 260 within an internal domain 290 such as an Intranet. Subsequently, the target service 240 can subscribe to the gateway service/proxy 230 in a demilitarized portion 280 of the network so that the gateway service proxy 230 can perform federated identity brokering on behalf of the target service 240. Notably, the gateway service/proxy 230 can be a trusted partner to the target service 240 as established by the trusted certifying authority 210.

Upon receiving the subscription, the gateway service/proxy 230 can retrieve the endpoint service description from the service description repository 260 in the internal domain 290 and can expand the service description, posting the expanded form of the service description to a service description repository 250 in the demilitarized portion 280 of the network. In particular, the gateway service/proxy 230 can interpret the security and location properties of the service description in order to evaluate conversion capabilities. For instance, the gateway service/proxy 230 can expand the service description to include a broader set of allowable security interactions. Based upon the evaluation, a new endpoint and service description can be generated, including a new service address to reference the gateway service/proxy 230 in lieu of the target service 240.

The service description repository 250 can be accessed by external entities in an external domain 270 as the service description repository 250 can be positioned within the demilitarized portion 280 of the network. A service requester 220 can access the service description repository 250 to located the target service 240. Responsive to the terms of the expanded form of the service description, the service requestor 220 can obtain credentials certified by a trusted certifying authority 210 in respect to the gateway service/proxy 230. The service requestor 220 in turn can submit the credentials to the gateway service/proxy 230 to establish the identity of the service requestor 220.

Relying upon the knowledge of the trusted certifying authority 210, the gateway service/proxy 230 can map the requirements of the target service 240 with the certification provided by the service requestor 220. In particular, the gateway service/proxy 230 can validate the credentials through the operation of a trusted certifying authority 210, or internally where the gateway service/proxy 230 acts as a trusted certifying authority 210. If the service requestor 220 can be validated, the gateway service/proxy 230 can route a service request provided by the service requestor 220 to the target service 240, the gateway service/proxy 230 acting as a trusted party to the target service 240. In consequence, the target service 240 can process the request, returning a response to the gateway service/proxy 230 which in turn can route the response to the service requestor 220.

Figure 3:
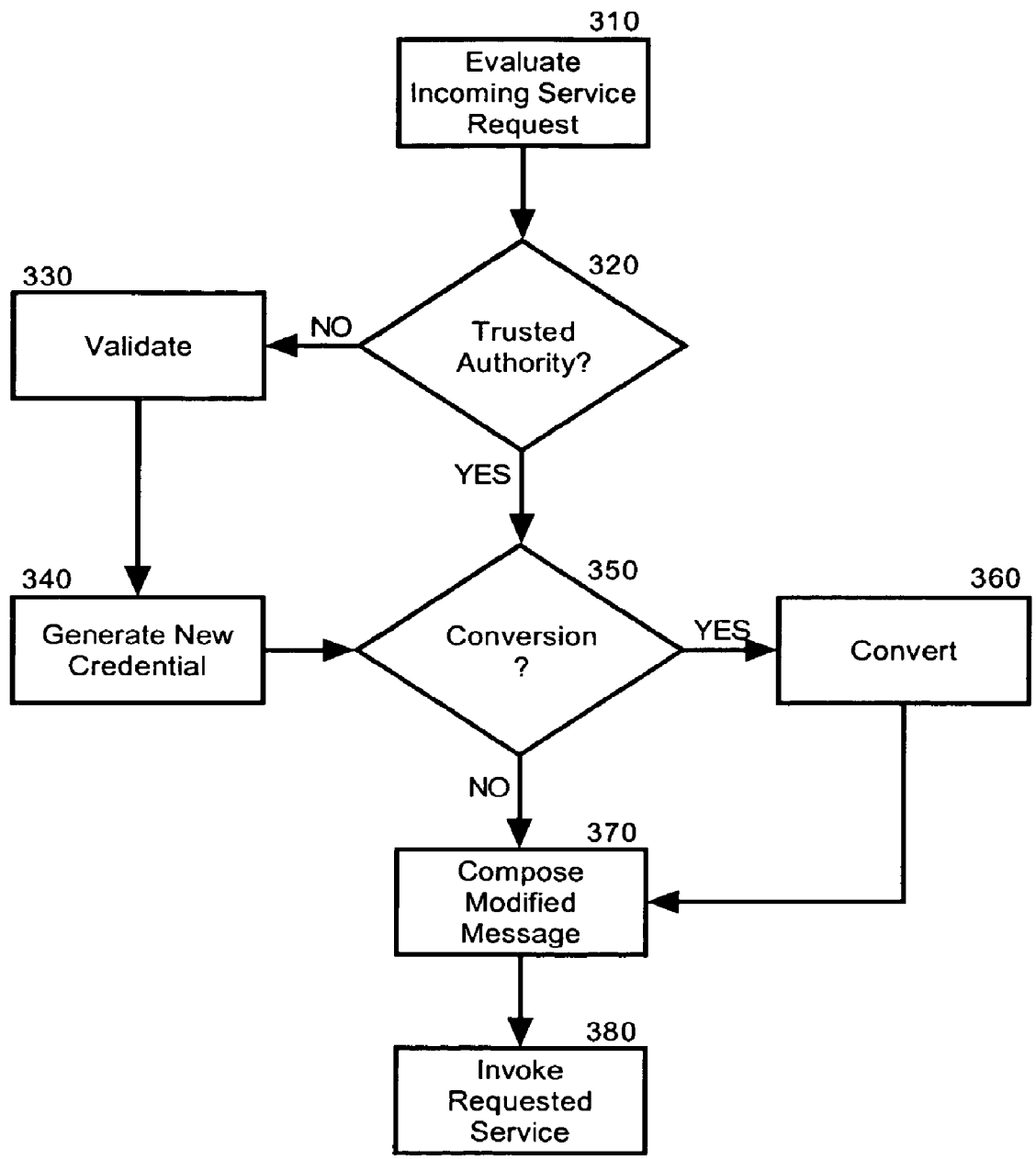

FIG. 3 is a flow chart illustrating a preferred federated identity brokering process in the network of FIG. 1. Beginning block 310, an incoming service request can be evaluated with respect to the security content of the incoming service request. In this regard, in decision block 320 it can be determined whether the credential has been certified by an authority trusted by the target service. If not, in block 330 the credential can be separately validated against the originally specified certifying authority and a new credential can be generated by a certifying authority trusted by the target service in block 340. Regardless, the process can continue through to decision block 350.

In decision block 350 the credentials specified in association with the request can be compared with a generated endpoint description for a target service specified in the service request to determine whether a conversion of the credentials will be required to comport with the required security of the target service. If so, in block 360 a modified form of the credentials can be generated to comport with the requirements of the target service. In either case, in block 370 a modified message can be composed based upon the incoming service request and the security credentials. Subsequently, in block 380 the target service can be invoked along with the modified message. Notably, a similar process can be repeated for handling a service response rather than a service request.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A federated identity brokering method, within a gateway, comprising the steps of:
   intercepting a service request from a service requestor targeting a specific logical service, the service request having an associated security credential;
   retrieving an original service description for said specific logical service from a privately accessible registry;
   expanding said original service description to include broader credential formats;
   changing a service address in said expanded service description for said specific logical service to specify a proxy to said specific logical service;
   publishing said expanded service description to a publicly accessible service registry;
   comparing a credential format of the security credential to a credential format specified by said specific logical service;
   modifying said security credential to comport with said credential format specified by said specific logical service upon determining that the credential format of the security credential does not match the credential format specified by said specific logical service; and
   routing said intercepted service request with said modified security credential to said specific logical service.

2. The method of claim 1, wherein said modifying step comprises the steps of:
   validating the security credential with a certifying authority not trusted by said logical service; and,
   asserting the security credential for said service request using a certifying authority which is trusted by said logical service.

3. A federated identity brokering system comprising:
   a gateway service/proxy configured for communicative coupling to a plurality of logical services and a plurality of service requestors;
   a private service description repository communicatively coupled to said gateway service/proxy and to said logical services and storing a plurality original endpoint service descriptions for said logical services, each of said original endpoint service descriptions indicating credential formats for corresponding ones of said logical services; and,
   a public service description repository communicatively coupled to said service requestors and said gateway service/proxy and storing expanded versions of said original endpoint service descriptions for said logical services,
   wherein the gateway service/proxy includes a processor configured to perform:
   intercepting a service request from a service requestor targeting a specific logical service, the service request having an associated security credential;
   retrieving an original service description for said specific logical service from the private service description repository;
   expanding the original service description to include broader credential formats;
   changing a service address in said expanded service description for said specific logical service to specify a proxy to said specific logical service;
   publishing said expanded service description to a public service description repository;
   comparing a credential format of the security credential to a credential format specified by said specific logical service;
   modifying said security credential to comport with said credential format specified by said specific logical service upon determining that the credential format of the security credential does not match the credential format specified by said specific logical service; and
   routing said intercepted service request with said modified security credential to said specific logical service.

4. The system of claim 3, wherein said gateway service/proxy is disposed in a demilitarized zone, said logical services and said private service description repository are disposed in a private network domain, and wherein said public service description is exposed for access by said service requestors.

5. The system of claim 3, wherein said logical services are Web services.

6. A machine readable storage medium having stored thereon a computer program for federated identity brokering, the computer program comprising a routine set of instructions which when executed by a machine cause the machine to perform the steps of:

intercepting a service request from a service requestor targeting a specific logical service, the service request having an associated security credential;

retrieving an original service description for said specific logical service from a privately accessible registry;

expanding said original service description to include broader credential formats;

changing a service address in said expanded service description for said specific logical service to specify a proxy to said specific logical service;

publishing said expanded service description to a publicly accessible service registry;

comparing a credential format of the security credential to a credential format specified by said specific logical service;

modifying said security credential to comport with said credential format specified by said specific logical service upon determining that the credential format of the security credential does not match the credential format specified by said specific logical service; and routing said intercepted service request with said modified security credential to said specific logical service.

7. The machine readable storage medium of claim 6, wherein said modifying step comprises the steps of:

validating the security credential with a certifying authority not trusted by said logical service; and, asserting the security credential for said service request using a certifying authority which is trusted by said logical service.

8. The system of claim 3, wherein said original endpoint service descriptions are formatted according to one of the Web services endpoint language (WSEL) and WS-Policy.

* * * * *